US007859227B2

(12) United States Patent
Saigo

(10) Patent No.: US 7,859,227 B2
(45) Date of Patent: Dec. 28, 2010

(54) STATE-OF-CHARGE ADJUSTING APPARATUS

(75) Inventor: Tsutomu Saigo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 653 days.

(21) Appl. No.: 11/826,702

(22) Filed: Jul. 18, 2007

(65) Prior Publication Data
US 2008/0036424 A1 Feb. 14, 2008

(30) Foreign Application Priority Data
Aug. 11, 2006 (JP) ............... 2006-219843

(51) Int. Cl.
H02J 7/00 (2006.01)
G01N 27/416 (2006.01)
G08B 21/00 (2006.01)
(52) U.S. Cl. .................. 320/136; 320/118; 324/426; 324/427; 340/636.1; 340/636.21
(58) Field of Classification Search .................. 320/136
See application file for complete search history.

(56) References Cited
U.S. PATENT DOCUMENTS
5,644,209 A * 7/1997 Chabbert et al. ............ 320/122

5,710,504 A * 1/1998 Pascual et al. ............. 180/65.8
6,133,707 A * 10/2000 Kikuchi et al. ............. 320/104
6,255,826 B1 * 7/2001 Ohsawa et al. ............. 324/426
6,459,236 B2 * 10/2002 Kawashima ................ 320/118
6,919,706 B2 * 7/2005 Furukawa ................... 320/116
2004/0056639 A1 * 3/2004 Saigo et al. ................. 320/120
2004/0079564 A1 * 4/2004 Tabata ....................... 180/65.2
2004/0178768 A1 * 9/2004 Miyazaki et al. ............ 320/116

FOREIGN PATENT DOCUMENTS
JP 2002-369400 12/2002

* cited by examiner

Primary Examiner—Edward Tso
Assistant Examiner—Yalkew Fantu
(74) Attorney, Agent, or Firm—Kratz, Quintos & Hanson, LLP

(57) ABSTRACT

The state-of-charge adjusting apparatus which enables to shorten a time to reach a capacity equalization is provided. A CPU extracts a block consisting of a plurality of unit cells connected continuously to each other, the plurality of the unit cells each having a voltage higher than a target voltage, and connects both ends of each block to a discharge resistance to make each block discharge. Thereafter, the CPU extracts a unit cell having a voltage higher than the target voltage and connects both ends of the extracted unit cell to the discharge resistance to make the extracted unit cell discharge until the voltage of the extracted unit cell reaches the target voltage.

4 Claims, 5 Drawing Sheets

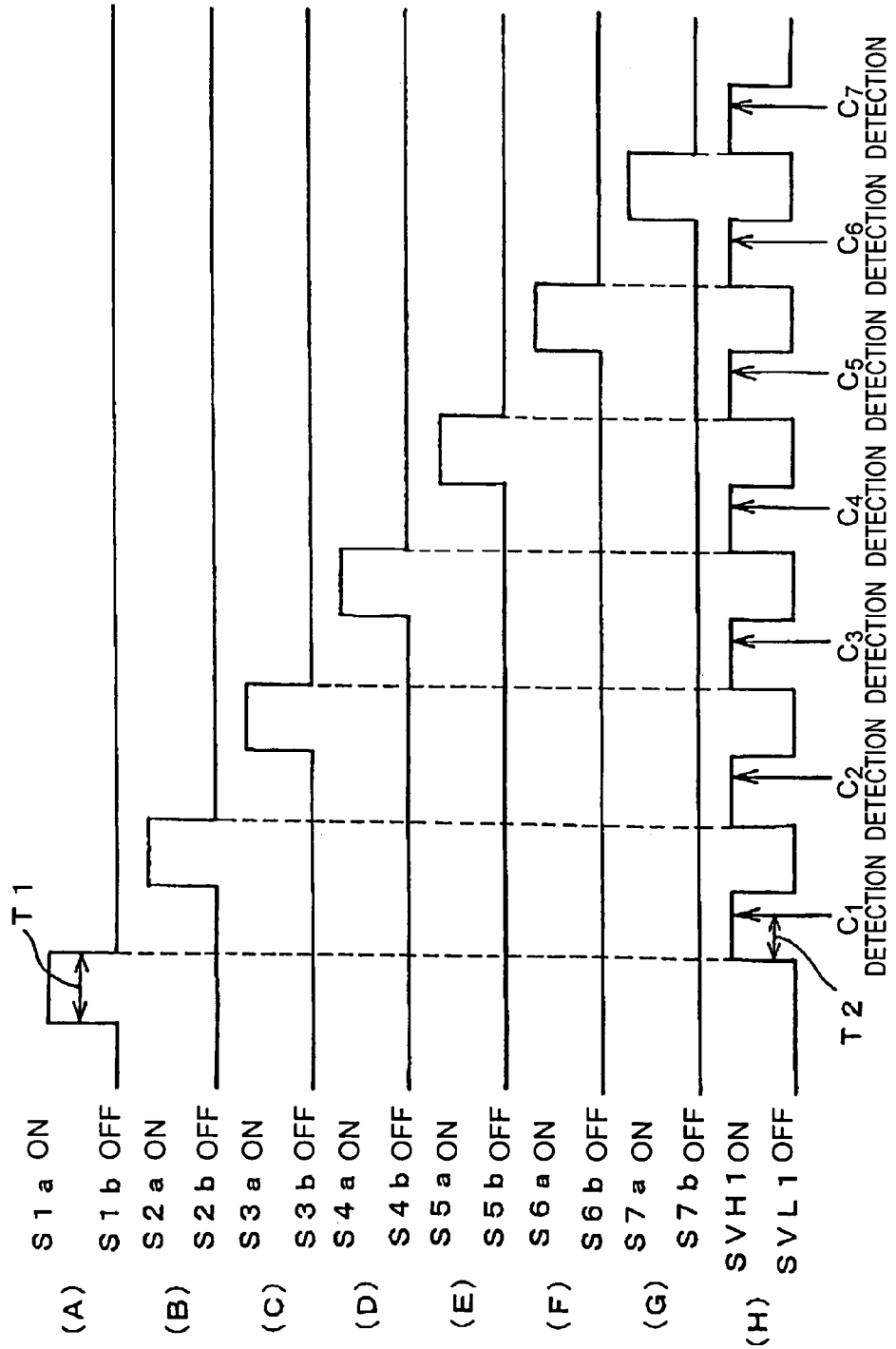

STATE-OF-CHARGE ADJUSTING APPARATUS

BACKGROUND OF THE INVENTION (1) Field of the Invention

The present invention relates to a state-of-charge adjusting apparatus, in particular, a state-of-charge adjusting apparatus, which includes: a voltage detecting means for detecting each voltage of a plurality of unit cells, the plurality of the unit cells consisting of secondary batteries connected in series; a discharge resistance for discharging the unit cell; and a capacity equalizing means for controlling discharge of the plurality of the unit cells through the discharge resistance on the basis of a voltage of each unit cell detected by the voltage detecting means so that the voltage values of the plurality of the unit cells become uniform.

(2) Description of the Related Art

Recently, a hybrid electric-internal combustion vehicle (hereinafter, HEV) which travels by using both of an engine and an electric motor has been widely spread. The hybrid motor vehicle includes two types of battery consisting of: a low-voltage battery having a voltage of about 12 V for starting the engine; and a high-voltage battery for driving the electric motor. The high-voltage battery provides a high voltage by connecting a plurality of unit cells in series, the unit cell being a secondary battery such as a nickel-hydrogen battery or a lithium battery.

As for the high-voltage battery, dispersion (i.e. non-uniformity) of a voltage of each unit cell, that is, dispersion of a state-of-charge (SOC) occurs by repeating charge and discharge. Therefore, upon charge and discharge of the battery, from the viewpoint of durability and safety of each cell, it is necessary to prohibit a charge at a time point when a voltage of a unit cell having the highest SOC (or the highest voltage) reaches a predetermined upper limit SOC (or a predetermined upper limit voltage value) and at a time point when a voltage of a unit cell having the lowest SOC (or the lowest voltage) reaches a predetermined lower limit SOC (or a predetermined lower limit voltage value).

Therefore, when dispersion of SOC occurs for each unit cell, a usable capacity of the battery is substantially decreased. As for an HEV, this undesirable phenomenon makes so-called an assist and regeneration insufficient, wherein the assist means a supplement of battery energy with respect to gasoline upon hill-climbing and the regeneration means regeneration of energy to the battery upon hill-coming down, thereby causing deterioration in a vehicle dynamic characteristic or fuel efficiency.

In order to solve the above problems, proposed is a discharge-type state-of-charge adjusting apparatus, in which each voltage of a plurality of unit cells are detected so as to calculate an average voltage value of the detected voltage values, the unit cells each having the voltage value higher than the calculated average voltage value are connected to the respective discharge resistances, and stored charge of each connected unit cell is subjected to discharge until the voltage of the connected unit cell reaches the average voltage value, said steps described above being repeated, so that dispersion (i.e. non-uniformity) of the voltage of each unit cell is removed (for example, see Japanese Patent Application Laid-Open No. 2002-369400).

However, in the conventional state-of-charge adjusting apparatus as described above, each unit cell is in turn connected to the discharge resistance and subjected to discharge one by one, therefore there is a problem that it takes so much time to reach the capacity equalization.

SUMMARY OF THE INVENTION

It is therefore an objective of the present invention to solve the above problem and to provide a state-of-charge adjusting apparatus which enables to shorten a time to reach the capacity equalization.

In order to attain the above objective, the present invention is to provide a state-of-charge adjusting apparatus including: a voltage detecting means for detecting each voltage of a plurality of unit cells, the plurality of the unit cells consisting of secondary batteries connected in series; a discharge resistance for discharging the unit cell; and a capacity equalizing means for controlling discharge of the plurality of the unit cells through the discharge resistance on the basis of a voltage of each unit cell detected by the voltage detecting means so that the voltage values of the plurality of the unit cells become uniform, wherein the capacity equalizing means includes: (a) a block extracting means which extracts a block consisting of a plurality of unit cells connected continuously to each other, said plurality of the unit cells each having a voltage higher than a target voltage; (b) a first equalizing discharge means which connects both ends of said each block to the discharge resistance so as to discharge said each block; (c) a unit cell extracting means which extracts a unit cell having a voltage higher than the target voltage after action of the first equalizing discharge means is finished; and (d) a second equalizing discharge means which connects both ends of the unit cell extracted by the unit cell extracting means to the discharge resistance so as to discharge the extracted unit cell until the voltage of the extracted unit cell reaches the target voltage.

With the construction described above, the first equalizing discharge means connects both ends of each block to the discharge resistance and makes each block discharge and thereafter, the second equalizing discharge means connects both ends of the unit cell extracted by the unit cell extracting means to the discharge resistance and makes the extracted unit cell discharge until the voltage of the extracted unit cell reaches the target voltage. That is, the plurality of the unit cells which construct the block can be collectively discharged simultaneously by the first equalizing discharge means and thereafter, each unit cell can be discharged one by one by the second equalizing discharge means. Therefore, a time required to reach the capacity equalization can be shortened.

The capacity equalizing means further includes a first discharge control means which makes the block extracting means and the first equalizing discharge means act repeatedly in sequence when the block extracting means extracts the block, and makes the first equalizing discharge means finish to act when the block extracting means does not extract the block any more.

With the construction described above, the first discharge control means makes the block extracting means and the first equalizing discharge means act repeatedly in sequence until the block extracting means does not extract the block any more. That is, the block can be repeatedly subjected to discharge until the block extracting means does not extract the block any more. Therefore, a time required to reach the capacity equalization can be further shortened.

The first equalizing discharge means connects both ends of said each block to the discharge resistance so as to discharge said each block for a first predetermined time period.

With the construction described above, both ends of said each block are connected to the discharge resistance and each block is subjected to discharge for the first predetermined time period until the block extracting means does not extract the block any more. That is, the block can be subjected to discharge until the block is not extracted any more with a simple construction. Therefore, a cost-down can be achieved.

The block extracting means extracts a block per group, said groups being obtained by dividing the plurality of the unit cells into plural.

With the construction described above, a block can be extracted per group so as to subject the extracted block to discharge. Therefore, a time required to reach the capacity equalization can be further shortened.

The second equalizing discharge means includes: a discharge means which discharges the unit cell for a second predetermined time period; and a second discharge control means which makes the discharge means repeat a discharge until a voltage of the unit cell reaches the target voltage, the voltage detecting means detecting said voltage of the unit cell whenever a discharge by the discharge means finishes.

With the construction described above, in the second equalizing discharge means, since the discharge means makes the unit cell discharge for a second predetermined time period, and the second discharge control means makes the discharge means repeat a discharge until a voltage of the unit cell reaches the target voltage, the voltage detecting means detecting said voltage of the unit cell whenever a discharge by the discharge means finishes, therefore the unit cell can be discharged to reach the target voltage without calculating a discharge time period on the basis of the target voltage and the voltage of the unit cell. That is, the unit cell can be correctly discharged to reach the target voltage without necessity of a complicated calculation.

BRIEF DESCRIPTION OF THE DRAWINGS

FIG. 3 is a time-chart illustrating an on-off state of a selection switch and a detection switch which construct the state-of-charge adjusting apparatus shown in FIG. 1;

DESCRIPTION OF THE PREFERRED EMBODIMENTS

Figure 1:
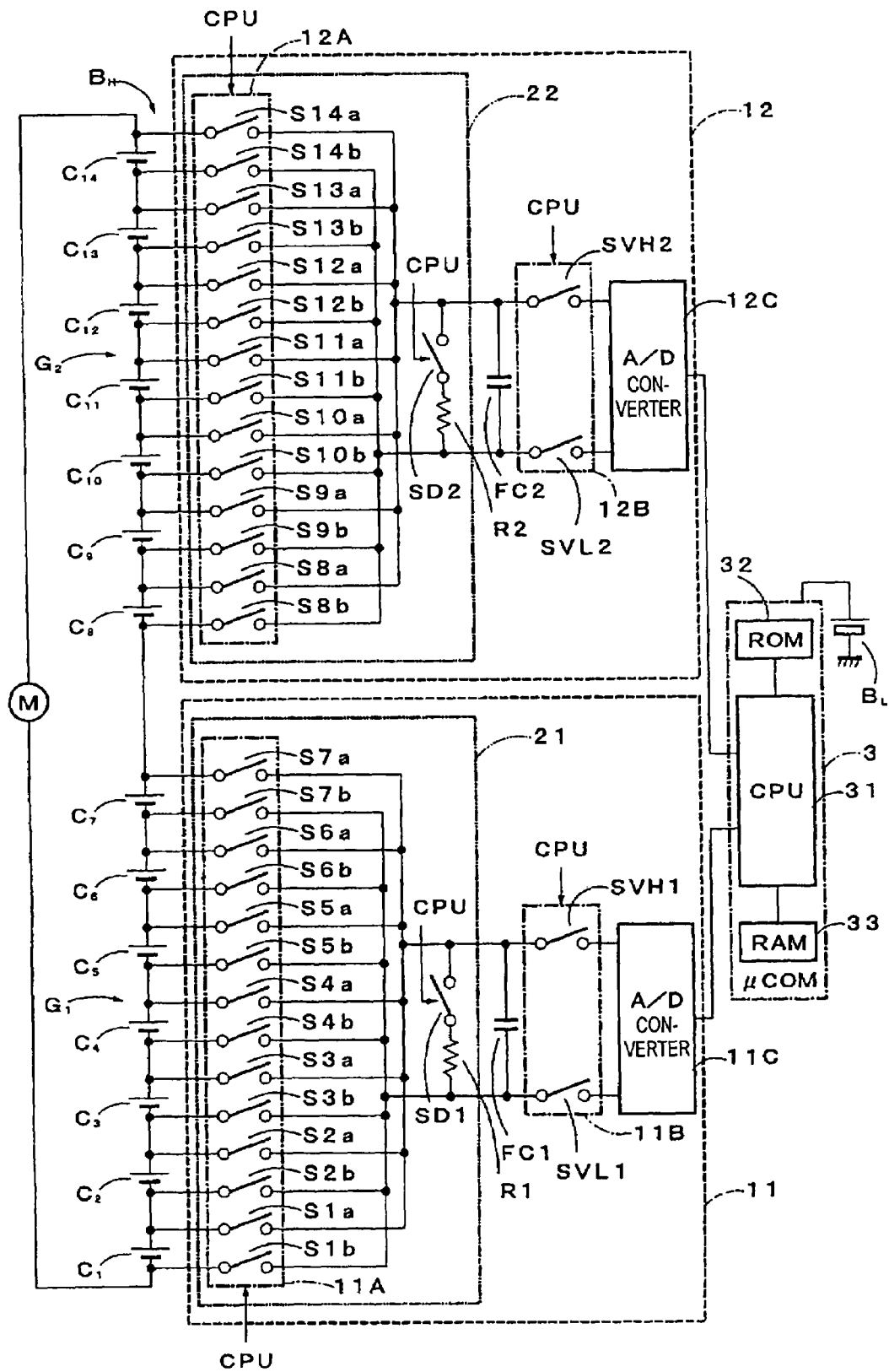
FIG. 1 is a circuit diagram illustrating a preferred embodiment of a state-of-charge adjusting apparatus according to the present invention.

In the following, a preferred embodiment of the present invention will be explained with reference to the attached drawings. FIG. 1 is a circuit diagram illustrating a preferred embodiment of a state-of-charge adjusting apparatus according to the present invention. A reference numeral $B_L$ in FIG. 1 denotes a low voltage battery. As shown in FIG. 1, the low voltage battery $B_L$ is composed of, for example, one secondary battery. The low voltage battery $B_L$ is used as an electric source to drive a starter for starting an engine. An alternator or the like as a battery charger is connected to both ends of the low voltage battery $B_L$ as the need arises.

In FIG. 1, a reference numeral $B_H$ denotes a high voltage battery. The high voltage battery $B_H$ is used as an electric source of an electric motor M in a HEV or an EV (electric-internal combustion vehicle) having an electric motor as a driving source for traveling. An electric motor M as a load is connected to both ends of the high voltage battery $B_H$ as the need arises. An alternator (not shown in the figure) or the like as a battery charger is connected to both ends of the high voltage battery $B_H$ as the need arises.

The high voltage battery $B_H$ is divided into a plurality of groups $G_1$ and $G_2$. The groups $G_1$ and $G_2$ are composed of seven unit cells $C_1$-$C_7$ and $C_8$-$C_{14}$, respectively. Each of the unit cells $C_1$-$C_{14}$ is composed of one secondary battery. In the preferred embodiment, to make an explanation simple, the high voltage battery $B_H$ is divided into the two groups $G_1$ and $G_2$. However, the high voltage battery $B_H$ may be divided into any plural groups. Also, in the preferred embodiment, the groups $G_1$ and $G_2$ are composed of seven unit cells $C_1$-$C_7$ and $C_8$-$C_{14}$, respectively. However, the number of the unit cells which compose each of groups $G_1$ and $G_2$, may be any plural number. Also, in the preferred embodiment, each of the unit cells $C_1$-$C_{14}$ is composed of one secondary battery. However, the number of the secondary battery which composes each of the unit cells $C_1$-$C_{14}$ may be plural.

The state-of-charge adjusting apparatus includes voltage-detecting circuits 11, 12, discharge circuits 21, 22, and microcomputer (µCOM) 3. The µCOM 3 controls the voltage-detecting circuits 11, 12 and the discharge circuits 21, 22. The µCOM 3 includes: a central processing unit (CPU) 31 which performs various processing in accordance with a program; ROM 32 which is an exclusive reading-out memory having a program of the processing performed by the CPU 31; and RAM 33, which is a memory capable of reading-out and writing, having a work area which is used in various processing steps in the CPU 31 and data storing area for storing various data.

The voltage-detecting circuits 11, 12 and the discharge circuits 21, 22 are provided per each of the groups $G_1$ and $G_2$. The voltage-detecting circuit 11 includes a group 11A of selection switches, capacitor FC1, a group 11B of detection switches, and analog-digital (A/D) converter 11C. The voltage-detecting circuit 12 includes a group 12A of selection switches, capacitor FC2, a group 12B of detection switches, and A/D converter 12C.

The CPU 31 controls turning-on and turning-off of the groups 11A, 12A of the selection switches and that of the groups 11B, 12B of the detection switches. The groups 11A, 12A of the selection switches and the groups 11B, 12B of the detection switches are composed of optical switches or magnetic switches and electrically insulated from the CPU 31.

The groups 11A and 12A of the selection switches include selection switches S1b-S7a and S8b-S14a, respectively, which are provided at both ends of the unit cells $C_1$-$C_7$ and $C_8$-$C_{14}$, respectively (see FIG. 1). The switches S1a-S7a and S8a-S14a connected to the respective plus sides of the unit cells $C_1$-$C_7$ and $C_8$-$C_{14}$ are connected to the plus side of the capacitors FC1 and FC2, respectively. On the other hand, the switches S1b-S7b and S8b-S14b connected to the respective minus sides of the unit cells $C_1$-$C_7$ and $C_8$-$C_{14}$ are connected to the minus side of the capacitors FC1 and FC2, respectively.

The groups 11B and 12B of the detection switches are composed of detection switches SVH1 and SVL1, and SVH2 and SVL2, respectively. The detection switches SVH1 and SVL1, and SVH2 and SVL2 are provided between both ends of the capacitors FC1 and FC2 and the A/D converters 11C and 12C, respectively (see FIG. 1). When the detection switches SVH1 and SVL1, and SVH2 and SVL2 are turned on, voltage of the capacitors FC1 and FC2 is supplied to the A/D converters 11C and 12C, respectively. The A/D converters 11C and 12C convert the voltage of the unit cells $C_1$-$C_7$ and $C_8$-$C_{14}$, which is supplied in turn through the capacitors FC1 and FC2, into a digital value and supplies it to the CPU 31.

The discharge circuit 21 includes the group 11A of the selection switches, discharge switch SD1, and discharge resistance R1. The discharge circuit 22 includes the group 12A of the selection switches, discharge switch SD2, and discharge resistance R2. The discharge switches SD1 and SD2 are provided between the switches S1a-S7a and S8a-S14a connected to the respective plus sides of the unit cells $C_1$-$C_7$ and $C_8$-$C_{14}$ and the discharge resistances R1 and R2, respectively. In the preferred embodiment, the voltage-detecting circuits 11 and 12 shares the groups 11A and 12A of the selection switches with the discharge circuits 21 and 22, respectively. However, instead, the voltage-detecting circuits 11 and 12 and the discharge circuits 21 and 22 may have respective separate groups of the selection switches.

Figure 2:
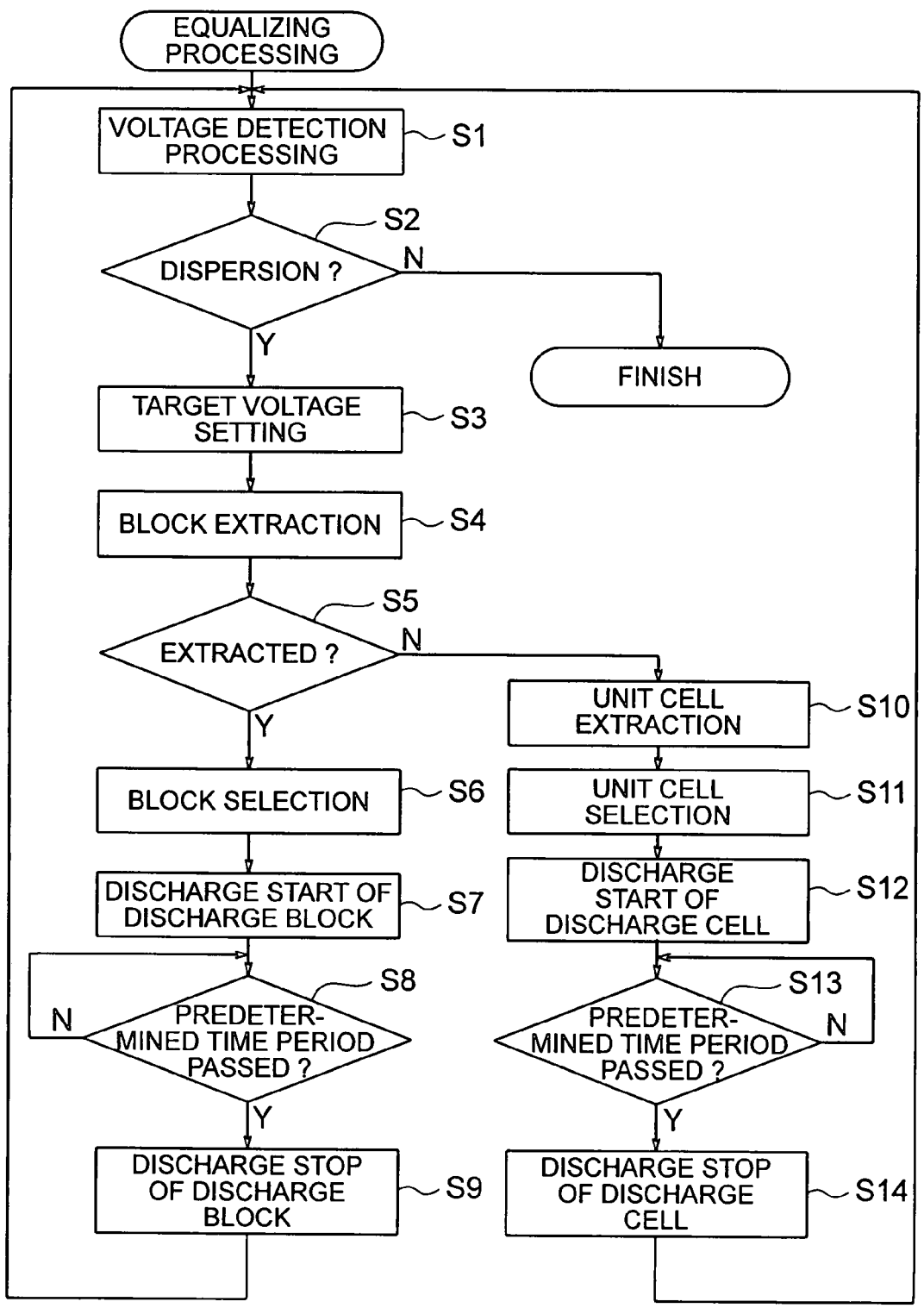
FIG. 2 is a flow chart illustrating a processing sequence of a CPU which constructs the state-of-charge adjusting apparatus shown in FIG. 1.

In the following, action of the state-of-charge adjusting apparatus having the structure described above will be explained with reference to FIGS. 2-5. FIG. 2 is a flow chart illustrating a processing sequence of the CPU 31 which constructs the state-of-charge adjusting apparatus shown in FIG. 1. FIG. 3 is a time-chart illustrating an on-off state of the selection switches S1a-S7b and the detection switches SVH1 and SVL1, which construct the state-of-charge adjusting apparatus shown in FIG. 1. FIGS. 4A-4D and 5A-5D are graphs illustrating action of the state-of-charge adjusting apparatus shown in FIG. 1.

First, when a specific period of time has passed until the voltage of the unit cells $C_1$-$C_{14}$ is stabilized after turning-off of the ignition switch, the CPU 31 functions as the capacity equalizing means, that is, the CPU 31 starts equalizing processing. In the equalizing processing, the CPU 31 performs voltage detecting processing in which the voltage values of all the unit cells $C_1$-$C_{14}$ are detected in turn (step S1).

In the voltage detecting processing, first, the CPU 31 controls to turn on the selection switches S1a and S1b at both ends of the unit cell $C_1$ for a predetermined charging time T1 (see FIG. 3 (A)). Thereby, both ends of the unit cell $C_1$ are connected to the capacitor FC1. The capacitor FC1 is charged so that its voltage becomes equal to the voltage of the unit cell $C_1$.

Thereafter, after the predetermined charging time T1 has passed, the CPU 31 controls to turn off the selection switches S1a and S1b at both ends of the unit cell $C_1$ so as to remove the connection between the unit cell $C_1$ and the capacitor FC1. Thereafter, the CPU 31 controls to turn on the detection switches SVH1 and SVL1 (see FIG. 3 (H)). Thereby, the voltage of the capacitor FC1 is supplied to the A/D converter 11C. When a predetermined detection time T2 has passed after turning-on of the detection switches SVH1 and SVL1, the CPU 31 detects the voltage of the capacitor FC1 sampled by the A/D converter 11C as the voltage of the unit cell $C_1$.

When the detection of the voltage of the unit cell $C_1$ is finished, the CPU 31 controls to turn off the detection switches SVH1 and SVL1 so as to remove the connection between the capacitor FC1 and the A/D converter 11C. Similarly, as for the unit cells $C_2$-$C_7$, the CPU 31 performs control to turn on the selection switches S2a-S7b connected to respective both ends of the unit cells $C_2$-$C_7$ and control to turn on the detection switches SVH1 and SVL1 alternatively in turn so as to detect the voltage values of the unit cells $C_2$-$C_7$ in turn (see FIG. 3 (B)-(H)).

Similarly, the CPU 31 performs detection of the voltage values of the unit cells $C_8$-$C_{14}$ which compose the group $G_2$. As is clear form the explanation described above, the voltage detection circuits 11 and 12 and CPU 31 construct the voltage detecting means.

When the voltage detection processing is finished, the CPU 31 judges whether or not there is dispersion in the voltage values of the unit cells $C_1$-$C_7$ and $C_8$-$C_{14}$ (step S2). Here, the CPU 31 extracts a maximum unit cell $C_{max}$ having the maximum voltage $V_{max}$ and a minimum unit cell $C_{min}$ having the minimum voltage $V_{min}$ from the unit cells $C_1$-$C_7$ and $C_8$-$C_{14}$ and then, judges whether or not there is dispersion in the voltage values of the unit cells $C_1$-$C_7$ and $C_8$-$C_{14}$ depending on whether or not a difference ($V_{max}$-$V_{min}$) is equal to or smaller than a predetermined tolerance voltage. If the difference ($V_{max}$-$V_{min}$) is equal to or smaller than the predetermined tolerance voltage, the CPU 31 judges that there is not dispersion (N at step S2) and finishes the equalizing processing.

On the other hand, if the difference ($V_{max}$-$V_{min}$) is larger than the predetermined tolerance voltage, the CPU 31 judges that there is dispersion (Y at step S2) and sets a target voltage (step S3). Here, for example, the CPU 31 sets the minimum voltage $V_{min}$ of the minimum unit cell $C_{min}$ as the target voltage. Thereafter, the CPU 31 functions as the block extracting means, that is, the CPU 31 extracts a block consisting of a plurality of the unit cells $C_1$-$C_{14}$ connected continuously to each other per the group $G_1$, $G_2$, said plurality of the unit cells $C_1$-$C_{14}$ each having a voltage higher than the target voltage (step S4). At step S4, if the voltage values of the unit cells $C_1$-$C_{14}$ are within the tolerance voltage with respect to the target voltage, said voltage values of the unit cells $C_1$-$C_{14}$ are judged to be equal to the target voltage.

Figure 4A:
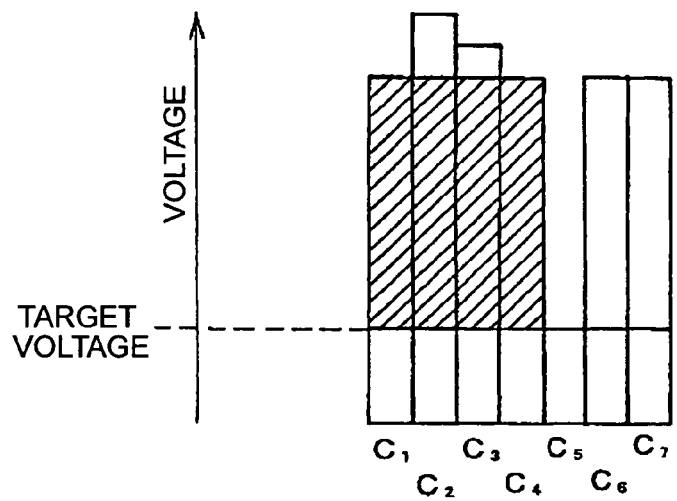
FIGS. 4A-4D are graphs illustrating action of the state-of-charge adjusting apparatus shown in FIG. 1.
Figure 5A:
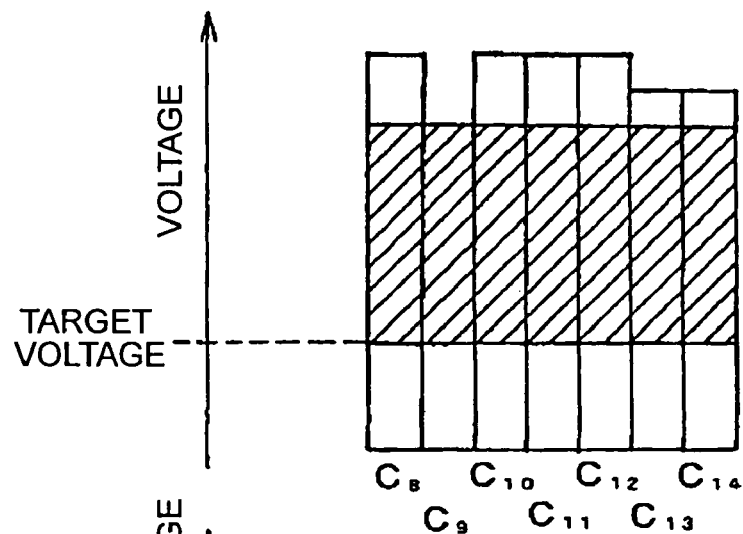
FIGS. 5A-5D are graphs illustrating action of the state-of-charge adjusting apparatus shown in FIG. 1.

In the following, the details of the extraction of the block will be explained with reference to FIGS. 4A and 5A. For example, as shown in FIG. 4A, it is supposed that there is dispersion in the voltage values of the unit cells $C_1$-$C_7$ which compose the group $G_1$. From the group $G_1$, two blocks are extracted, that is, a block consisting of the unit cells $C_1$-$C_4$ and a block consisting of the unit cells $C_6$ and $C_7$ are extracted. On this assumption, as shown in FIG. 5A, it is supposed that there is dispersion in the voltage values of the unit cells $C_8$-$C_{14}$ which compose the group $G_2$. From the group $G_2$, one block consisting of the unit cells $C_8$-$C_{14}$ is extracted.

Thereafter, the CPU 31 judges whether or not a block is extracted at step S4 (step S5). If a block is extracted from at least one of the groups $G_1$ and $G_2$ (Y at step S5), the CPU 31 selects a block having the large number of the unit cells from the blocks extracted per group $G_1$, $G_2$, as a discharge block (step S6).

In the following, the details of selecting the discharge block will be explained with reference to FIGS. 4A and 5A. As shown in FIG. 4A, in a case in which two blocks consisting of a block consisting of the unit cells $C_1$-$C_4$ and a block consisting of the unit cells $C_6$ and $C_7$ are extracted at step S4, the CPU 31 selects the block consisting of the unit cells $C_1$-$C_4$ having the large number of the unit cells as the discharge block of the group $G_1$.

On the other hand, as shown in FIG. 5A, in a case in which only one block consisting of the unit cells $C_8$-$C_{14}$ is extracted at step S4, the CPU 31 selects the block consisting of the unit cells $C_8$-$C_{14}$ as the discharge block of the group $G_2$. If there is no block extracted at step S4, the CPU 31 does not select the discharge block. Thereafter, the CPU 31 connects both ends of the selected discharge blocks of the groups $G_1$ and $G_2$ to the discharge resistances R1 and R2, respectively, so as to start simultaneously discharge of the discharge blocks of the respective groups $G_1$ and $G_2$ (step S7).

For example, if the block consisting of the unit cells $C_1$-$C_4$ is selected as the discharge block, the CPU 31 controls to turn on the discharge switch SD1 and selection switches S1b and S4a so as to connect both ends of the discharge block consisting of the unit cells $C_1$-$C_4$ to the discharge resistance R1 and starts the discharge. If the block consisting of the unit cells $C_8$-$C_{14}$ is selected as the discharge block, the CPU 31 controls to turn on the discharge switch SD2 and selection switches S8b and S14a so as to connect both ends of the discharge block consisting of the unit cells $C_8$-$C_{14}$ to the discharge resistance R2 and starts the discharge.

When a predetermined time period (the first predetermined time period) passes after the discharge of the discharge block is started (Y at step S8), the CPU 31 controls to turn off the discharge switches SD1, SD2 and selection switches 11A, 12A so as to stop the discharge of the discharge block (step S9) and thereafter, returns to step S1. By repeating steps S1-S9, as for the group $G_1$, the discharge is performed until a voltage value of the unit cells $C_1$ and $C_4$ having the minimum voltage value in the discharge block consisting of the unit cells $C_1$-$C_4$ reaches the target voltage (see FIG. 4B). That is, the electric capacity shown by the diagonal lines in FIG. 4A is discharged.

Thereafter, at step S4, the CPU 31 extracts two blocks consisting of a block consisting of the unit cells $C_2$ and $C_3$ and a block consisting of the unit cells $C_6$ and $C_7$.

Figure 4B:
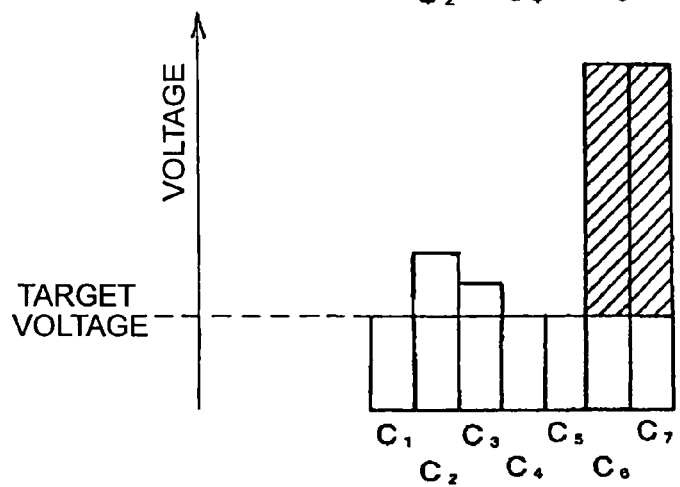

If the numbers of the unit cells which composes a plurality of the extracted blocks are the same, arbitrary one (i.e. given one) block of the plurality of the extracted blocks is set to be the discharge block. At step S6, for example, the CPU 31 selects a block consisting of the unit cells $C_6$ and $C_7$ as the discharge block. Further, when the steps S1-S9 are repeated, the discharge is performed until a voltage value of the unit cells $C_6$ and $C_7$ having the minimum voltage value in the discharge block consisting of the unit cells $C_6$ and $C_7$ reaches the target voltage (see FIG. 4C). That is, the electric capacity shown by the diagonal lines in FIG. 4B is discharged.

Figure 4C:
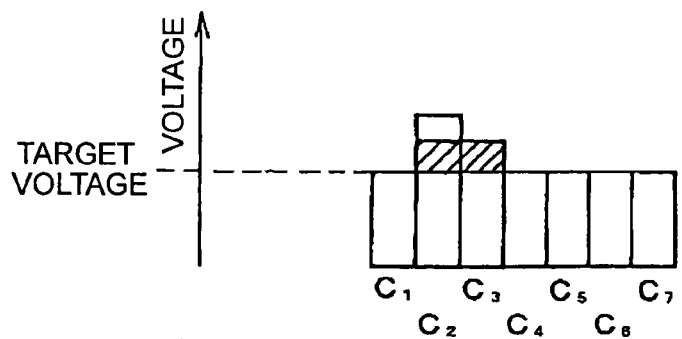

Thereafter, at step S4, the CPU 31 extracts one block consisting of the unit cells $C_2$ and $C_3$. Thereafter, at step S6, the CPU 31 selects a block consisting of the unit cells $C_2$ and $C_3$ as the discharge block. Further, when the steps S1-S9 are repeated, the discharge is performed until a voltage value of the unit cell $C_3$ having the minimum voltage value in the discharge block consisting of the unit cells $C_2$ and $C_3$ reaches the target voltage (see FIG. 4D). That is, the electric capacity shown by the diagonal lines in FIG. 4C is discharged. Thereafter, at step S4, the CPU 31 does not extract a block of the group $G_1$.

Figure 5B:
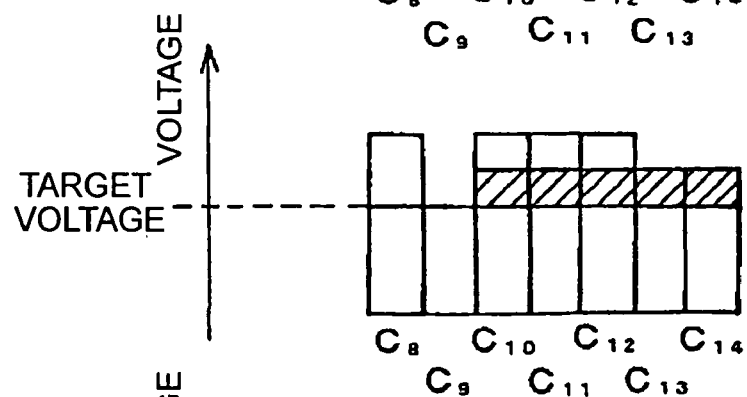

Meanwhile, by repeating steps S1-S9, as for the group $G_2$, the discharge is performed until a voltage value of the unit cell $C_9$ having the minimum voltage value in the discharge block consisting of the unit cells $C_8$-$C_{14}$ reaches the target voltage (see FIG. 5B). That is, the electric capacity shown by the diagonal lines in FIG. 5A is discharged.

Thereafter, at step S4, the CPU 31 extracts one block consisting of the unit cells $C_{10}$ and $C_{14}$. Thereafter, at step S6, the CPU 31 selects a block consisting of the unit cells $C_{10}$-$C_{14}$ as the discharge block. Further, when the steps S1-S9 are repeated, the discharge is performed until a voltage value of the unit cells $C_{13}$ and $C_{14}$ having the minimum voltage value in the discharge block consisting of the unit cells $C_{10}$-$C_{14}$ reaches the target voltage (see FIG. 5C). That is, the electric capacity shown by the diagonal lines in FIG. 5B is discharged.

Figure 5C:
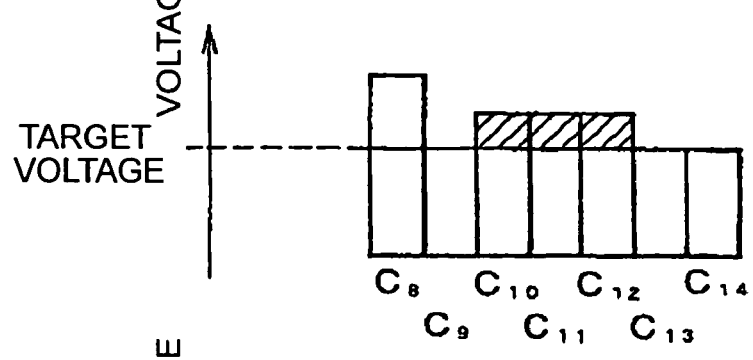

Thereafter, at step S4, the CPU 31 extracts one block consisting of the unit cells $C_{10}$-$C_{12}$. Thereafter, at step S6, the CPU 31 selects a block consisting of the unit cells $C_{10}$-$C_{12}$ as the discharge block. Further, when the steps S1-S9 are repeated, the discharge is performed until a voltage value of the unit cells $C_{10}$-$C_{12}$ having the minimum voltage value in the discharge block consisting of the unit cells $C_{10}$-$C_{12}$ reaches the target voltage (see FIG. 5D). That is, the electric capacity shown by the diagonal lines in FIG. 5C is discharged. Thereafter, at step S4, the CPU 31 does not extract a block of the group $G_2$. When a block is not extracted in all the groups $G_1$, $G_2$ (N at step S5), the CPU 31 advances to the next step S10.

As is clear from the actions described above, at steps S6-S9, the CPU 31 functions as the first equalizing discharge means, that is, the CPU 31 connects both ends of the respective blocks to the discharge resistances R1, R2 for a predetermined time period so as to allow the respective blocks to discharge. At step S5, the CPU 31 functions as the first discharge control means, that is, the CPU 31 performs the actions of step S4 and steps S6-S9 in turn repeatedly while a block is being extracted at step S4, and finishes the actions of steps S6-S9 when a block is not being extracted at step S4.

At step S10, the CPU 31 extracts a unit cell having a voltage higher than the target voltage. For example, in the group $G_1$, on such a condition shown in FIG. 4D that no block is being extracted, the unit cell $C_2$ is extracted. Meanwhile, in the group $G_2$, on such a condition shown in FIG. 5D that no block is being extracted, the unit cell $C_8$ is extracted. The CPU 31 selects a unit cell having high voltage from the unit cells extracted per group $G_1$, $G_2$ as the discharge cell (step S11).

Figure 4D:
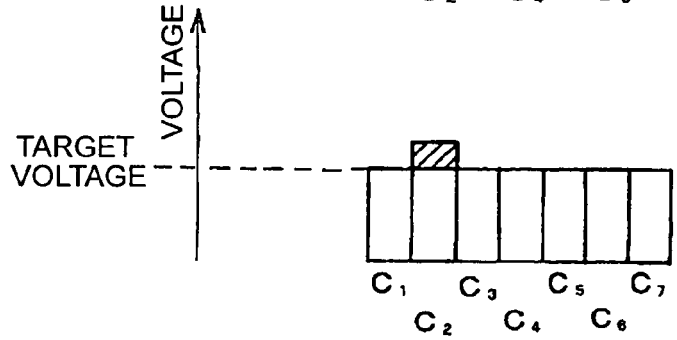
Figure 5D:
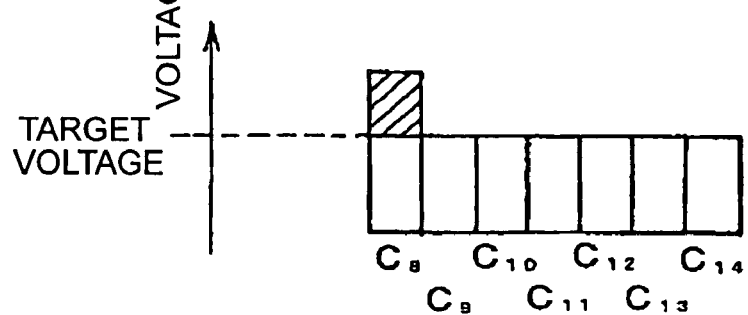

For example, as shown in FIG. 4D, if only one unit cell $C_2$ is extracted, the CPU 31 selects the unit cell $C_2$ as the discharge cell. Similarly, as shown in FIG. 5D, if only one unit cell $C_8$ is extracted, the CPU 31 selects the unit cell $C_8$ as the discharge cell. Thereafter, the CPU 31 connects both ends of the selected discharge cell to the discharge resistance R1, R2 and starts discharge of the discharge cell (step S12).

For example, when the unit cell $C_2$ is selected as the discharge cell, the CPU 31 controls to turn on the discharge switch SD1 and the selection switches S2b and S2a so as to connect both sides of the unit cell $C_2$ to the discharge resistance R1 and starts a discharge. When the unit cell $C_8$ is selected as the discharge cell, the CPU 31 controls to turn on the discharge switch SD2 and the selection switches S8b and S8a so as to connect both sides of the unit cell $C_8$ to the discharge resistance R2 and starts a discharge.

When a predetermined time period (the second predetermined time period) passes after the discharge of the discharge cell is started (Y at step S13), the CPU 31 controls to turn off the discharge switches SD1, SD2 and selection switches 11A, 12A so as to stop the discharge of the discharge cell (step S14) and thereafter, returns to step S1. By repeating steps S1-S5 and S1-S14, as for the group $G_1$, the discharge is performed until a voltage value of the unit cell $C_2$ reaches the target voltage (see FIG. 4D). That is, the electric capacity shown by the diagonal lines in FIG. 4D is discharged.

Meanwhile, by repeating steps S1-S5 and S11-S14, as for the group $G_2$, the discharge is performed until a voltage value of the unit cell $C_8$ reaches the target voltage. That is, the electric capacity shown by the diagonal lines in FIG. 5D is discharged. When each voltage value of the unit cells $C_1$-$C_{14}$ of the groups $G_1$ and $G_2$ reaches the target voltage, it is judged that there is no dispersion at step S2 and the equalizing processing is finished.

As is clear from the actions described above, by repeating steps S1-S5 and S12-S14, the CPU 31 functions as the second equalizing discharge means, that is, the CPU 31 connects both ends of the unit cell extracted at step S10 to the discharge resistance so as to allow the unit cell to discharge until a voltage value of the unit cell reaches the target voltage.

At steps S12-S14 the CPU 31 functions as the discharge means, that is, the CPU 31 allows the unit cell to discharge for a predetermined time period, and at step S2 the CPU 31 functions as the second discharge control means, that is, the CPU 31 detects a voltage of the unit cell by a voltage detecting processing at step S1 whenever a discharge at steps S12-S14 finishes and repeats the discharge at steps S12-S14 until the detected voltage reaches the target voltage.

According to the state-of-charge adjusting apparatus described above, as shown in steps S6-S9, the plurality of the unit cells, which compose the block, are simultaneously discharged together and thereafter, as shown in steps S11-S14, each unit cell can be discharged one by one, thereby a time required for the capacity equalization can be shortened.

Further, according to the state-of-charge adjusting apparatus described above, the extraction of a block at step S4 and the discharge of the block at steps S6-S7 are repeated in turn until no block is extracted any more by the extraction of the block at step S4. Therefore, the discharge of the block can be repeatedly performed until no block is extracted any more by the extraction of the block at step S4, thereby a time required for the capacity equalization can be further shortened.

Further, according to the state-of-charge adjusting apparatus described above, as shown in steps S6-S9, the CPU 31 connects both ends of each block to the discharge resistance R1, R2 for a predetermined time period and allows each block to discharge. That is, it is repeated that the CPU 31 connects both ends of each block to the discharge resistance R1, R2 for a predetermined time period and allows each block to discharge until no block is extracted any more by the extraction of the block at step S4. Therefore, the block can be discharged with a simple construction until no block is extracted any more, so that a cost-down can be attained.

Further, according to the state-of-charge adjusting apparatus described above, a block consisting of two unit cells having different voltage values from each other is not extracted as the block. Thereby, an electrical connection between both ends of such a block consisting of two unit cells having different voltage values from each other and the discharge resistance R1, R2 can be omitted, therefore a time required for the capacity equalization can be further shortened.

Further, according to the state-of-charge adjusting apparatus described above, since the block extraction at step S4 is performed per group $G_1$, $G_2$, which are obtained by dividing the plurality of the unit cells $C_1$-$C_{14}$ into plural groups, therefore the blocks can be extracted per group $G_1$, $G_2$, thereby a time required for the capacity equalization can be further shortened.

Further, according to the state-of-charge adjusting apparatus described above, the unit cells $C_1$-$C_{14}$ are discharged for a predetermined time period at steps S12-S14, then each voltage of the unit cells $C_1$-$C_{14}$ is detected by the voltage detection processing at step S1 whenever the discharge is finished and then, the discharge of the unit cells $C_1$-$C_{14}$ is repeated until the detected voltage value reaches the target voltage so as to remove the dispersion. Therefore, the unit cells $C_1$-$C_{14}$ can be discharged to reach the target voltage without calculating a discharge period of time on the basis of the target voltage and the voltage of the unit cells. Therefore, the unit cells $C_1$-$C_{14}$ can be correctly discharged to reach the target voltage without complicated calculation.

In the preferred embodiment described above, the discharge of the block is repeatedly performed until no block is extracted any more by the extraction of the block at step S4 and thereafter, the discharge of each unit cell is performed. However, in the present invention, the discharge of the unit cells $C_1$-$C_{14}$ may be performed after at least one discharge of the block is carried out as long as the block is extracted, that is, for example, the CPU 31 may proceed from step S9 to step S10 instead of returning to step S1 from step S9. However, the preferred embodiment described above is advantageous, since the discharge of the block is repeatedly performed until no block is extracted any more by the extraction of the block at step S4, thereby an amount of charges to be discharged together can be made large and therefore, a time required for the capacity equalization can be shortened. In this connection, as is clear from the flow chart shown in FIG. 2, in a case in which a block is not extracted at the initial step S4, the discharge of a block is not performed and only the discharge of the unit cells $C_1$-$C_{14}$ is performed.

In the preferred embodiment described above, as shown in steps S6-S9, the CPU 31 connects both ends of each block to the discharge resistance R1, R2 for a predetermined time period and allows each block to discharge. However, instead, for example, the CPU 31 may extract a block minimum unit cell having the minimum voltage value from the unit cells $C_1C_{14}$ which compose the block, calculate a discharge time period for the block minimum unit cell to reach the target voltage, and connect both ends of the block to the discharge resistance for the calculated time period. However, in this case, a complicated calculation is necessary to obtain the discharge time period, resulting in that a CPU 31 having high capability of processing is required, causing a cost-up. Therefore, the preferred embodiment described above is advantageous.

In the preferred embodiment described above, the extraction of the block is performed per group $G_1$, $G_2$. However, instead, the block may be extracted as to a plurality of the unit cells $C_1$-$C_{14}$, which compose the high-voltage battery $B_H$.

Further, in the preferred embodiment described above, in steps S10-S14, the CPU 31 connects both ends of the unit cells $C_1$-$C_{14}$ to the discharge resistance R1, R2 for a predetermined time period and allows the unit cells $C_1$-$C_{14}$ to discharge. However, instead, for example, the CPU 31 may calculate a discharge time period for the unit cells $C_1$-$C_{14}$ to reach the target voltage and connect both ends of the unit cells $C_1$-$C_{14}$ $C_{14}$ to the discharge resistance R1, R2 for the calculated time period. However, in this case, a complicated calculation is necessary to obtain the discharge time period, resulting in that a CPU 31 having high capability of processing is required, causing a cost-up. Therefore, the preferred embodiment described above is advantageous.

The aforementioned preferred embodiments are described to aid in understanding the present invention and variations may be made by one skilled in the art without departing from the spirit and scope of the present invention.

What is claimed is:

1. A state-of-charge adjusting apparatus comprising:
 a voltage detecting means for detecting each voltage of a plurality of unit cells, the plurality of the unit cells consisting of secondary batteries connected in series;
 a discharge resistance connectable to at least one of the unit cells for discharging at least one of the unit cells; and
 a capacity equalizing means for controlling discharge of the plurality of the unit cells through the discharge resistance on the basis of a voltage of each unit cell detected by the voltage detecting means so that the voltage values of the plurality of the unit cells become uniform,
 wherein the capacity equalizing means includes:
 (a) a block extracting means which extracts a block consisting of a plurality of unit cells connected continuously to each other, said plurality of the unit cells each having a voltage higher than a target voltage;
 (b) a first equalizing discharge means which then connects both ends of said block extracted by the block extracting means to the discharge resistance so as to discharge said extracted block;

(c) a unit cell extracting means which extracts a unit cell having a voltage higher than the target voltage after action of the first equalizing discharge means is finished; and (d) a second equalizing discharge means which then connects both ends of the unit cell extracted by the unit cell extracting means to the discharge resistance so as to discharge the extracted unit cell until the voltage of the extracted unit cell reaches the target voltage;

wherein the capacity equalizing means further includes a first discharge control means which makes the block extracting means and the first equalizing discharge means act repeatedly in sequence when the block extracting means extracts the block, until no blocks having a voltage higher than the target voltage are present and makes the first equalizing discharge means finish to act when the block extracting means does not extract the block any more, and then, following the absence of blocks having a voltage higher than the target voltage, makes the unit cell extracting means and the second equalizing discharge means act repeatedly in sequence when the unit cell extracting means extracts the unit cell, until no unit cells having a voltage higher than the target voltage are present, and makes the second equalizing discharge means finish to act when the unit cell extracting means does not extract the unit cell anymore.

2. The apparatus according to claim 1, wherein the first equalizing discharge means connects both ends of said each block to the discharge resistance so as to discharge said each block for a first predetermined time period.

3. The apparatus according to claim 1, wherein the block extracting means extracts a block per group, said groups being obtained by dividing the plurality of the unit cells into groups of unit cells, each group of unit cells having less unit cells than said plurality of unit cells.

4. The apparatus according to claim 1, wherein the second equalizing discharge means includes:

a discharge means which discharges the unit cell for a second predetermined time period; and a second discharge control means which makes the discharge means repeat a discharge until a voltage of the unit cell reaches the target voltage, the voltage detecting means detecting said voltage of the unit cell whenever a discharge by the discharge means finishes.

* * * * *